United States Patent [19]
Yamashita et al.

[11] Patent Number: 5,313,191
[45] Date of Patent: May 17, 1994

[54] WARNING DEVICE FOR AN ELECTRIC VEHICLE

[75] Inventors: Shoji Yamashita; Shoji Motodate; Yoshihiro Nakazawa; Satoshi Honda; Kenji Tamaki, all of Saitama, Japan

[73] Assignee: Honda Giken Kogyo Kabushiki Kaisha, Tokyo, Japan

[21] Appl. No.: 774,595

[22] Filed: Oct. 10, 1991

[30] Foreign Application Priority Data

Nov. 26, 1990 [JP] Japan .................... 2-123953[U]
Mar. 22, 1991 [JP] Japan .................... 3-059218

[51] Int. Cl.⁵ .................................... B60Q 1/00
[52] U.S. Cl. .................... 340/439; 340/457; 340/461; 180/65.1; 180/220; 318/139; 367/9.1; 367/10.1; 367/10.7
[58] Field of Search ............ 340/439, 457, 457.1, 340/461, 427; 180/65.1, 220; 318/139; 307/9.1, 10.6, 10.7, 10.1

[56] References Cited

U.S. PATENT DOCUMENTS

| | | | |
|---|---|---|---|
| 3,773,131 | 11/1973 | Jaulmes | 180/220 |
| 4,227,132 | 10/1980 | Cavil et al. | 180/271 |
| 4,346,364 | 8/1982 | Takagi et al. | 340/457 |
| 4,351,405 | 9/1982 | Fields et al. | 180/65.2 |
| 4,406,342 | 9/1983 | Lacroix | 180/220 |
| 4,734,673 | 3/1988 | Murata et al. | 340/439 |
| 4,933,852 | 6/1990 | Lemelson | 340/439 |
| 5,101,924 | 8/1992 | Yamagiwa et al. | 180/220 |
| 5,139,121 | 8/1992 | Kumura et al. | 180/65.1 |

FOREIGN PATENT DOCUMENTS

| | | | |
|---|---|---|---|
| 0324884 | 7/1989 | European Pat. Off. | 340/439 |
| 51-32007 | 9/1976 | Japan . | |

Primary Examiner—John K. Peng
Assistant Examiner—Nina Tong

[57] ABSTRACT

A warning device is provided for use in an electric vehicle which includes a frame member and ground engaging wheels operative mounted relative to the frame member. An electric motor is operatively connected to the frame member and the ground engaging wheels for supplying rotational motion to the ground engaging wheels. A switch member is provided for selectively energizing the electric motor. An indicator member is provided for indicating to an operator that the electric vehicle has completed a preparing to start operation. The switch member may be a switch for operatively connecting the electric motor to a source of power. The indicator member may provide a visual display or an audible sound for warning the operator.

23 Claims, 11 Drawing Sheets

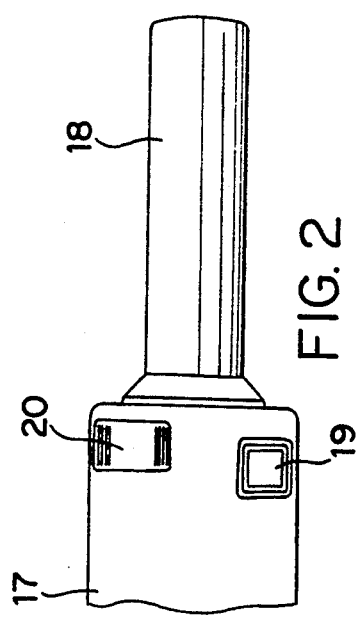
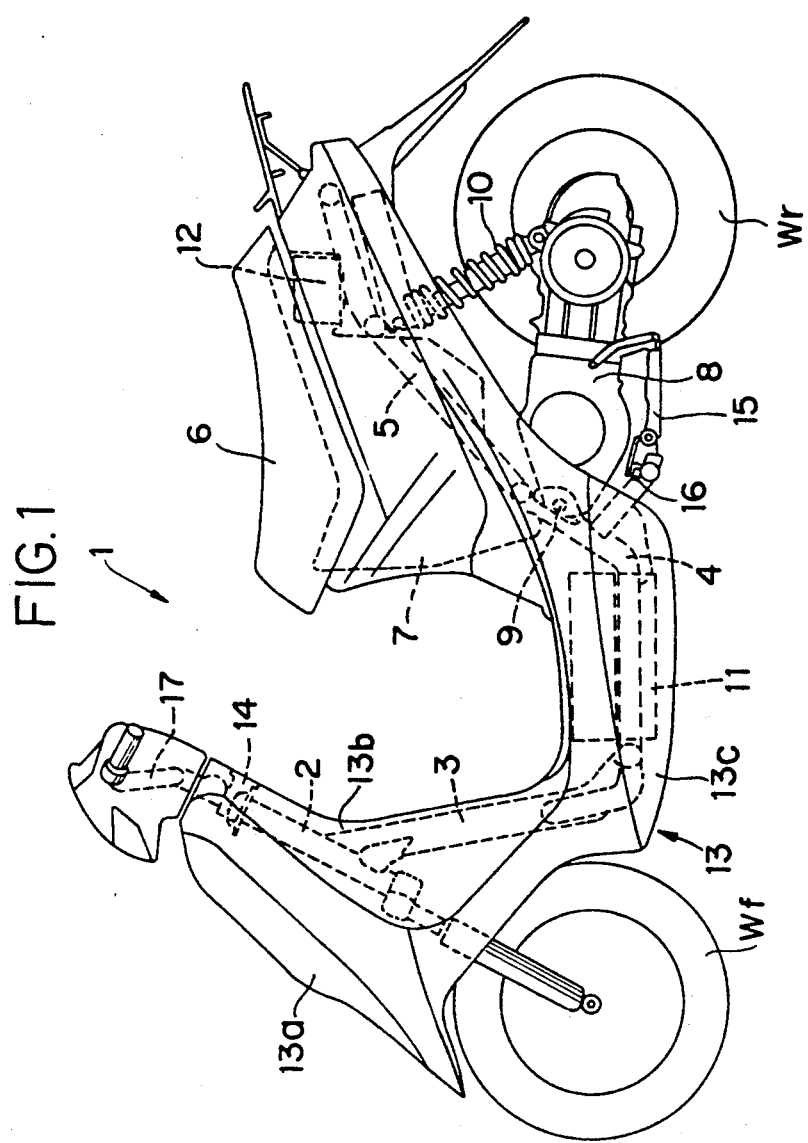

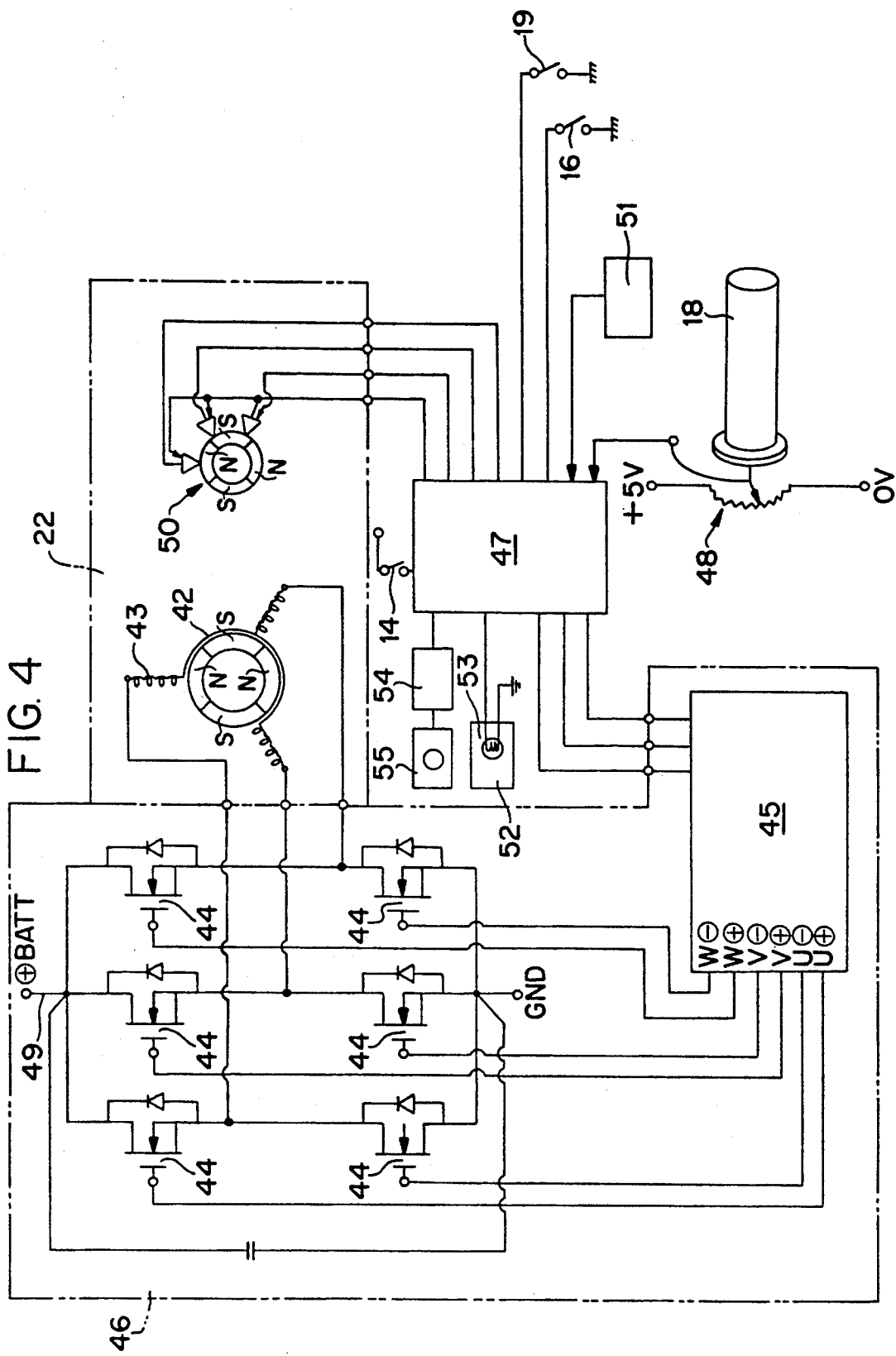

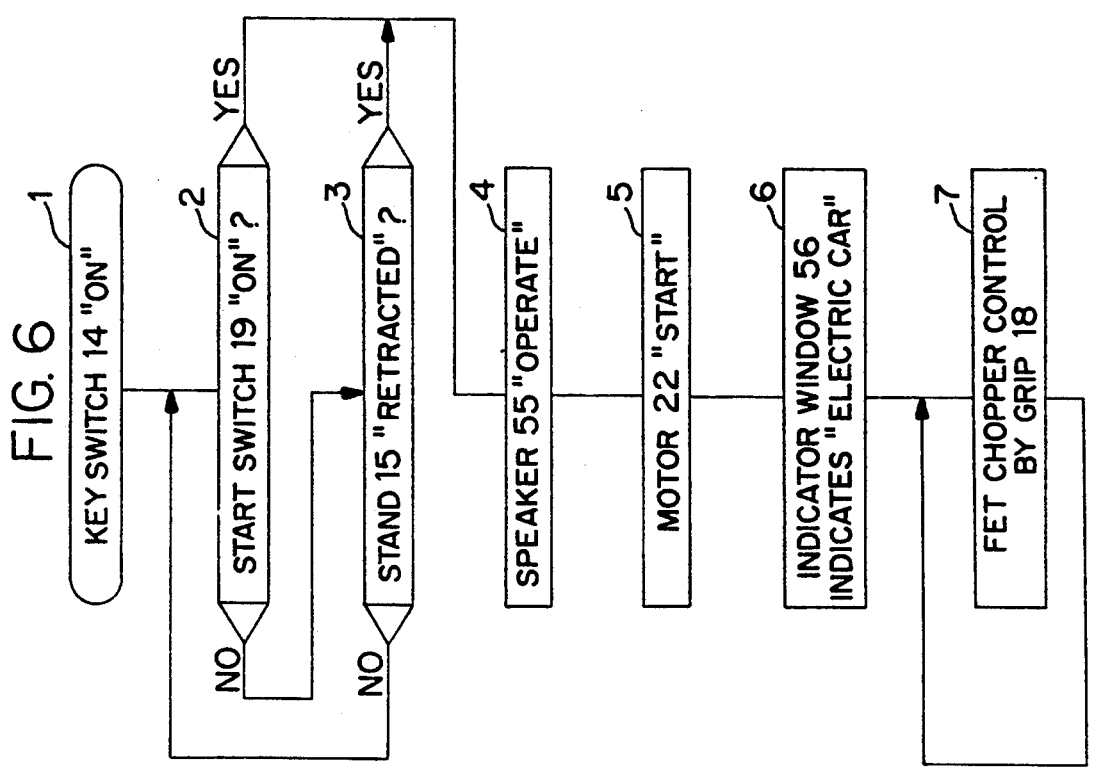
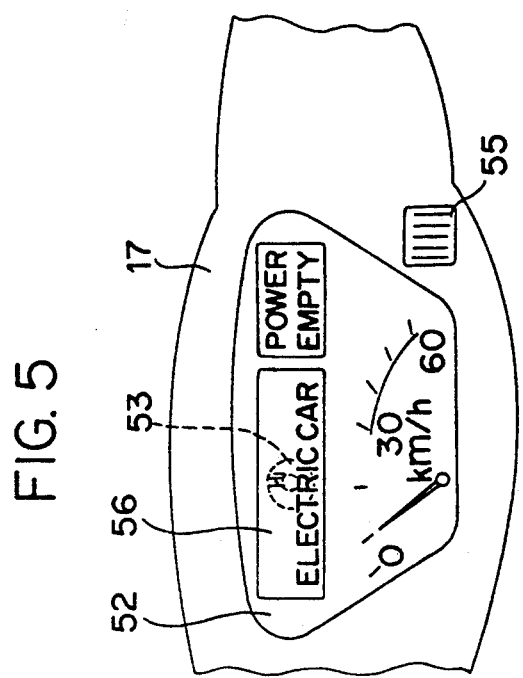

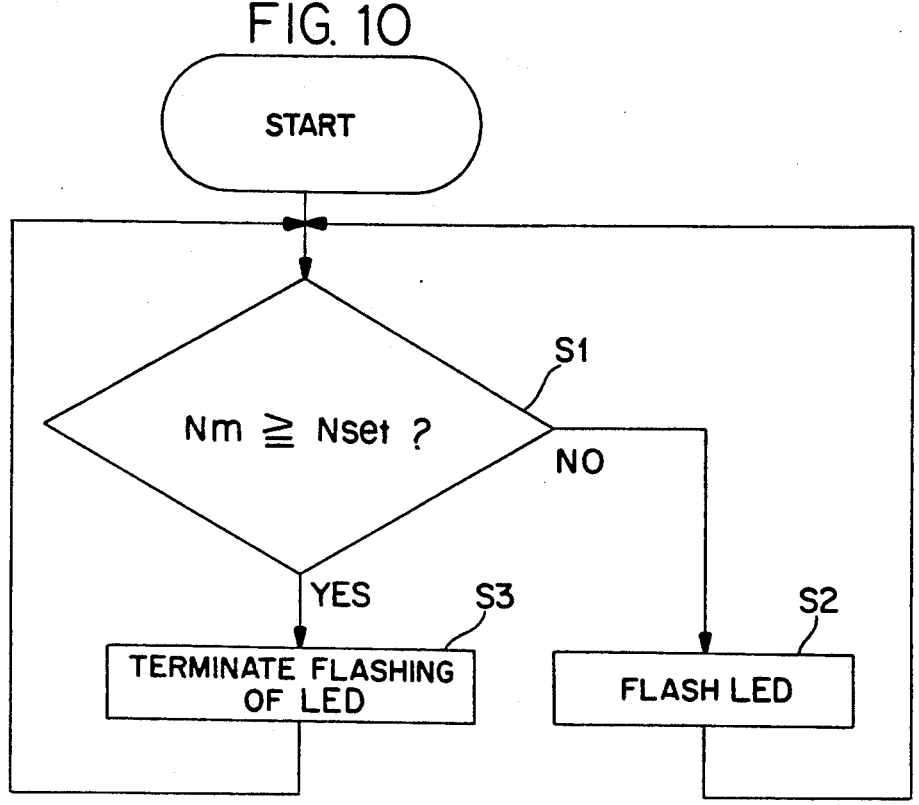
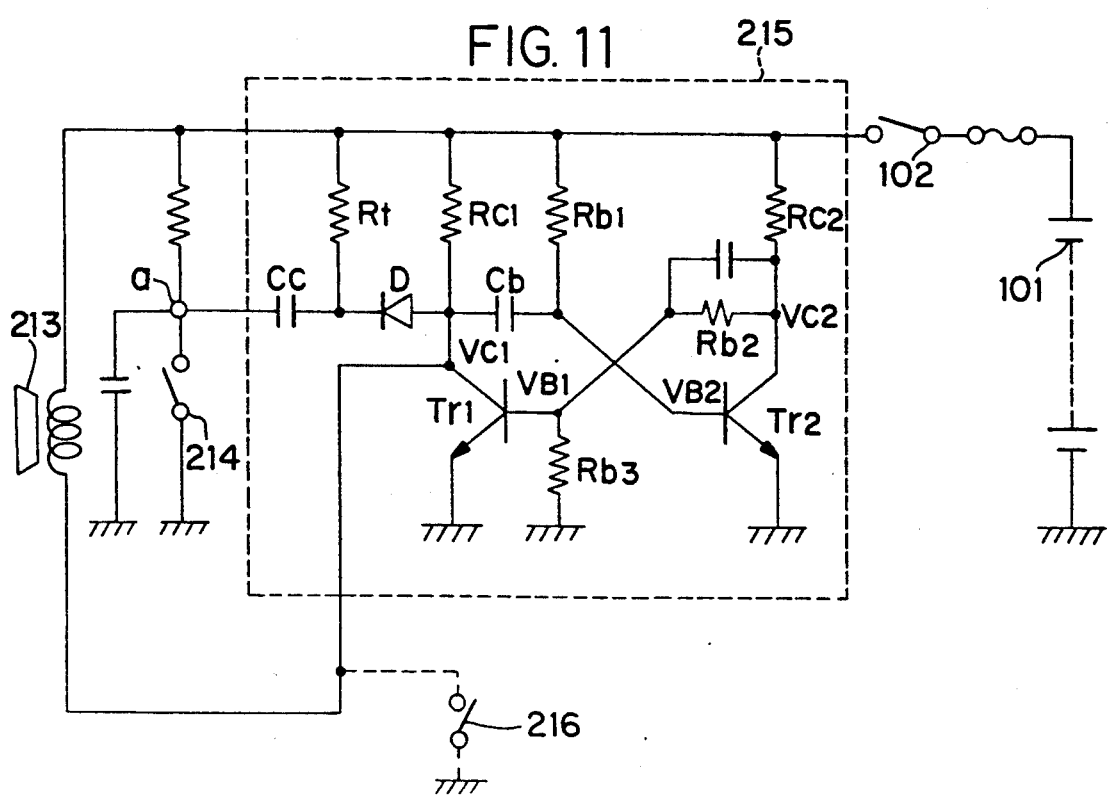

FIG. 13A Pt
FIG. 13B VB1
FIG. 13C VC1
FIG. 13D VB2
FIG. 13E VC2
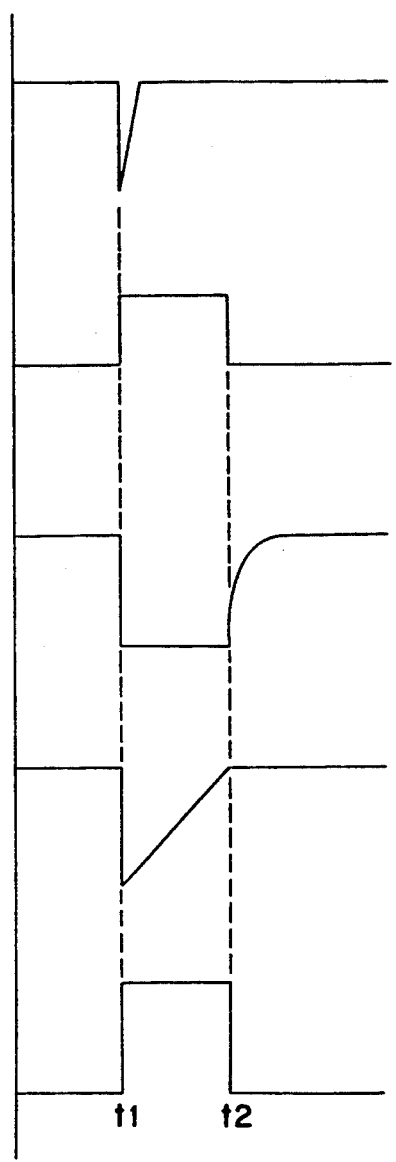
FIG. 14
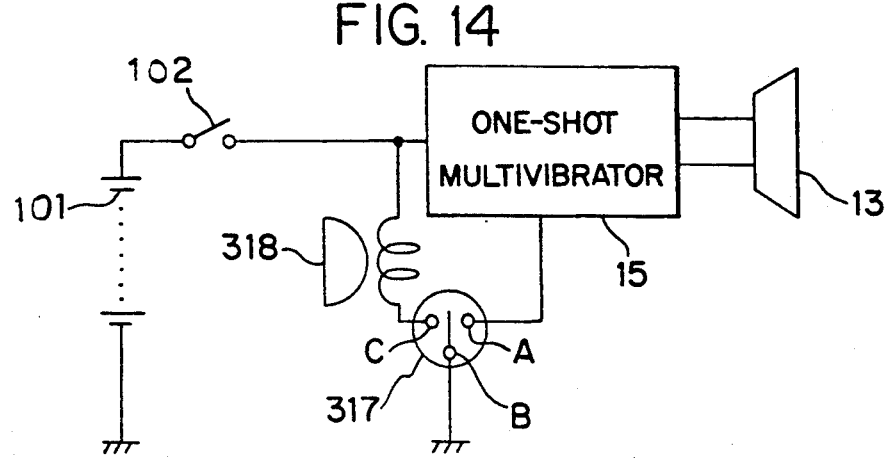

|  | A | B | C |
|---|---|---|---|
| COMMUNICATION SWITCH | O—O |  |
| FREE |  |  |  |
| NORMAL HORN SWITCH |  | O—O |

WARNING DEVICE FOR AN ELECTRIC VEHICLE

BACKGROUND OF THE INVENTION

1. Field of the Invention

The present invention relates to a device for informing an operator that a vehicle is an electric vehicle adapted to run on a road at the initial starting of the electric vehicle. An information device is provided for visually and/or audibly informing the operator that the preparation for starting the electric vehicle has been completed.

2. Description of Background Art

In an electric vehicle, a manually operated clutch is not provided between the motor and the ground engaging wheels. The arrangement utilized in an electric vehicle is distinct from a vehicle utilizing an internal combustion engine as the prime mover. An internal combustion engine vehicle will be hereinafter referred to as an engine vehicle.

The electric vehicle is provided with a speed operating member such as an accelerator grip or an accelerator pedal, which can be operated with the same feeling as presented in the engine vehicle. However, an operator may turn on a start switch and operate the speed operating member to an open position in an electric vehicle at the starting of the motor with the same feeling as in the engine vehicle. Such an operation of an electric vehicle may cause a problem. As a technique for preventing this problem, it is known that a motor circuit should not be controlled if the speed operating member is returned to a full closed position as set forth in Japanese Patent Publication No. 51-32007.

Further, in mass production of the electric vehicle, it is considered advantageous to utilize parts of many engine vehicles presently manufactured and sold. This technique is helpful for productivity and decreasing cost.

In addition, in a vehicle which is powered by an internal combustion engine, wherein the rotation of the power source is maintained during the time when the vehicle is stopped. More specifically, during an idling condition of the engine, the power source continues to rotate. Accordingly, in the case wherein the vehicle is traveling on a route with heavy traffic, the rotation of the power source is disadvantageous from the standpoint of energy consumption. Further, at the starting of the vehicle, the operator recognizes that the preparation of the starting of the vehicle has been completed, according to the idling condition of the engine.

On the other hand, an electric vehicle adapted to travel by means of an electric motor as a prime mover with a battery is not required to maintain rotation of the prime mover during the time when the vehicle is stopped. Accordingly, even when the electric vehicle is traveling on a route with heavy traffic, the vehicle is advantageous from the standpoint of energy consumption.

However, the electric vehicle does not have an idling condition of the engine as mentioned above. The motor is not rotated until the electric vehicle starts to run. Therefore, the operator familiar with the driving of the vehicle when using the internal combustion engine feels discomfort if the operator cannot recognize the preparation for starting of the electric vehicle has been completed.

As an information device for informing the operator that the preparation for starting of the electric vehicle has been completed, a lamp lighting system is known such that a lamp continues to be illuminated during the connection of the lamp to a power source.

In the above case where the electric vehicle employs the same or like parts as those of the engine vehicle, an operator familiar with driving an engine vehicle is apt to operate the electric vehicle in the same manner as he or she would operate the engine vehicle. Therefore, there is a possibility that the operator would feel discomfort at the starting of the electric vehicle.

It is accordingly an object of the present invention to provide a vehicle which can prevent a feeling of discomfort during the starting of the vehicle.

SUMMARY AND OBJECTS OF THE INVENTION

According to the present invention, a warning device is provided in an electric vehicle having a motor as a prime mover for driving the wheels. The warning device includes means for signaling to the operator to recognize that the vehicle is an electric vehicle with a distinct starting operation.

When a start preparing operation such as turning-on of a start switch is carried out, the warning device generates a signal for audibly or visually advising the operator that the vehicle is an electric vehicle.

In addition, in the above conventional information device for the electric vehicle, the lamp is illuminated at all times. Accordingly, if the illumination of the lamp is emphasized so as to permit the operator to sufficiently recognize the completion of the start preparing condition, the operator is annoyed by the illumination of the lamp during operation of the vehicle, especially at night.

To cope with this, the brightness of the illumination is usually suppressed, and the lamp is continuously illuminated. Accordingly, the operator cannot sufficiently recognize the completion of the start preparation condition at the actual starting of the electric vehicle.

Further, the lamp is continuously illuminated during the connection of the power as described above. Accordingly, in the case where the electric vehicle is traveling on a route with heavy traffic, the electricity is wastefully consumed.

It is accordingly an object of the present invention to provide an information device for an electric vehicle which enables an operator to sufficiently recognize the completion of the start preparation condition without feeling an annoyance, eliminates wasteful consumption of electricity, and eliminates the feeling of discomfort even in the case where an operator who is familiar with the driving of a vehicle adapted to run by using an internal combustion engine changes to a vehicle operated by electricity.

According to the present invention, an electric vehicle is adapted to travel by driving an electric motor with a battery or the like. An information device including a plurality of indicating means and a control means are provided for driving the motor which is operatively connected to said battery or the like and sequentially flashing a plurality of indicating means to inform the operator that the electric vehicle is in a start preparing condition. The flashing of said plurality of indicating means is terminated to inform the operator that the electric vehicle has completed the start preparation condition when a rotating speed of said motor reaches a preset value or more.

According to the present invention, an electric vehicle is provided for traveling by means of a motor with a battery or the like. An information device includes a horn, a communication switch and control means for sounding the horn for a predetermined period of time after a main switch is turned on. The sounding of the horn for a predetermined period of time after said communication switch is turned on is activated when the main switch is on.

According to the present invention, when the power is supplied from the battery or the like to the control means, the control means drives the motor and sequentially flashes a plurality of indicating means to inform the operator that the electric vehicle is in the start preparing condition. Subsequently, when the rotating speed of the motor reaches the preset value or more, the control means terminates the flashing of the plurality of indicating means to inform the operator that the electric vehicle has completed the start preparation condition.

According to the present invention, when the main switch is turned on, the control means sounds the horn for a predetermined period of time. Further, when the communication switch is turned on under the condition that the main switch is on, the control means sounds the horn for a predetermined period of time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a side view of a motor cycle to which the present invention is applied;

FIG. 2 is an enlarged view of a part of the handle;

FIG. 4 is a diagram of the motor control circuit;

FIG. 5 is an elevational view of the instrument panel;

FIG. 6 is a flow chart of the control operation;

FIG. 10 is a flow chart of the operation of the control circuit 106 shown in FIG. 7;

FIG. 11 is a circuit diagram illustrating an electrical construction of the information device according to another preferred embodiment of the present invention;

FIGS. 13A-13E is a timing chart illustrating signal waveforms at different positions in the one-shot multivibrator 215 shown in FIG. 11;

FIG. 14 is a circuit diagram illustrating an electrical construction of the information device according to another preferred embodiment of the present invention;

DETAILED DESCRIPTION OF THE PREFERRED EMBODIMENT

Figure 3:
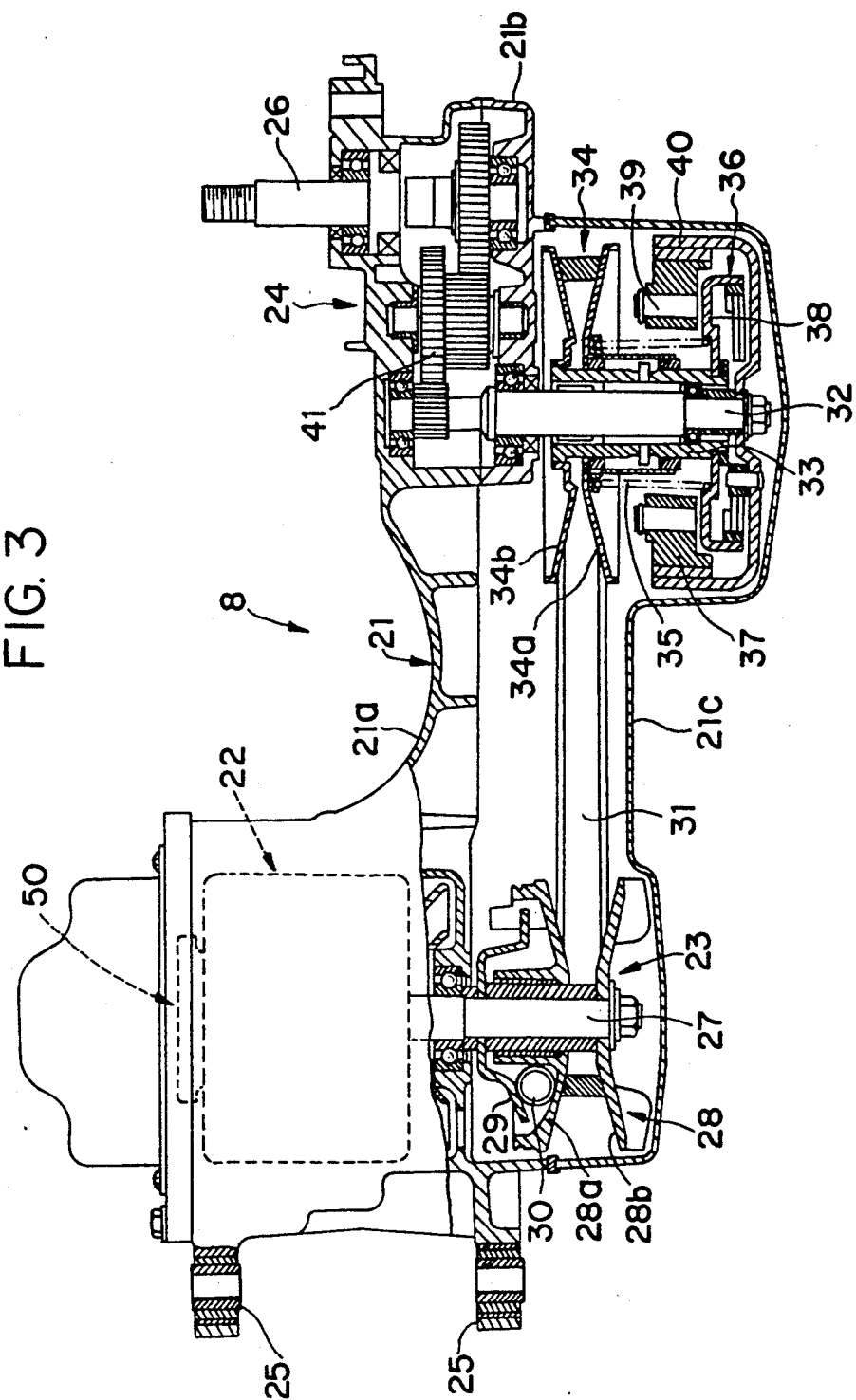
FIG. 3 is a sectional view of the power unit.

There will now be described a preferred embodiment of the present invention with reference to the drawings.

Referring to Figure a motor cycle includes a head pipe 2, a down tube 3, a bottom frame 4 extending from the down tube 3, a rear frame 5 extending from the bottom frame 4, and a luggage box 7 mounted on the rear frame 5. The luggage box 7 is provided with a seat 6 also serving as a lid of the luggage box 7. A power unit 8 includes a motor, a transmission, etc. The power unit 8 is provided at its rear portion with a rear wheel Wr, and is pivotably supported at its front portion to the rear frame 5 by means of a pivot 9. A cushion 10 is interposed between an upper surface of the rear portion of the power unit 8 and the rear frame 5.

A battery 11 for driving the motor is mounted on the bottom frame 4, and a charger 12 for charging the battery 11 is mounted in the luggage box 7. A cover 13 consisting of a front cover 13a, an inner cover 13b, a side cover 13c, etc. for covering the above-mentioned members is fixed to the frame. A key switch 14 is mounted on the inner cover 13b. A main stand 15 and a microswitch type stand switch 16 adapted to be opened and closed by the main stand 15 are mounted on a rear bracket of the bottom frame 4. As shown in FIG. 2, a handle 17 is provided with a speed operating member 18, a start switch 19, and a lighting switch 20. The speed operating member 18 is constructed to be similar to an accelerator grip.

As shown in FIG. 3, the power unit 8 includes an outer shell formed by a case 21. The case 21 consists of a case body 21a, an inner cover 21b, and an outer cover 21c. The case 21 houses a motor 22, a transmission 23, and a speed reducer 24. A pair of pivotal connecting portions 25 are adapted to be connected with the pivot 9 which project from a front end of the case 21. A rear axle 26 projects from a side surface of a rear portion of the case 21.

A variable-diameter drive V-pulley 28 of the transmission 23 is mounted on an output shaft 27 of the motor 22. A centrifugal weight 30 is interposed between a movable sheave 28a of the drive V-pulley 28 and a guide 29. The movable sheave 28a is urged toward a fixed sheave 28b of the drive V-pulley 28 by the centrifugal weight 30 in accordance with an increase in rotating speed of the motor 22, thereby enlarging an operational radius of a belt 31. On the other hand, a sleeve 33 is loosely engaged with a driven shaft 32, and a variable-diameter driven V-pulley 34 is mounted on the sleeve 33 at an inner end portion thereof. A movable sheave 34a of the driven V-pulley 34 is normally biased by a spring 35 toward a fixed sheave 34b of the driven V-pulley 34.

A centrifugal clutch 36 is provided at an outer end portion of the driven shaft 32. Clutch members 37 of the centrifugal clutch 36 are rotatably mounted on pins 39 projecting from a disk 38 fixed to the sleeve 33. A clutch drum 40 of the centrifugal clutch 36 is fixed to the driven shaft 32. Accordingly, when the driven V-pulley 34 is rotated at a predetermined speed, the clutch members 37 are rotated about the respective pins 39 by a centrifugal force to come into contact with the clutch drum 40. Thus, the centrifugal clutch 36 is brought into engagement with the driven shaft 32 to thereby drive the driven shaft 32. A torque of the driven shaft 32 is transmitted through a gearing arrangement 41 of the speed reducer 24 to the rear axle 26, thereby driving the rear axle 26.

The motor 22 is of a known FET chopper control type, and as shown in FIG. 4, it includes rotor 42 having a permanent magnet N.S. and fields 43 connected to a driver 46 having FET transistors 44 and a pre-driver 45, so that the rotating speed of the motor 22 is controlled to a desired value by a controller 47 through the driver 46. The controller 47 receives a voltage adjusted by the grip 18 and a variable resistor 48 as a control signal. In FIG. 4, a power circuit 49 and 50 is provided for the battery 11. In addition, a rotational angle detecting section is provided for the control of the transistors.

A vehicle speed detecting device 51 for detecting a rotating speed of a front wheel Wf, the key switch 14, the stand switch 16, and the start switch 19 are connected to the controller 47 as input elements. Further, a back light 53 mounted in a speedometer housing 52, a voice recorder 54, and a speaker 55 are connected as output elements to the controller 47. As shown in FIG. 5, the back light 53 is located in the speedometer housing 52 provided on an upper surface of the handle 27. The back light 53 illuminates an indicator window 56 for indicating that the vehicle is an electric vehicle. The speaker 55 is provided adjacent to the speedometer 52.

The controller 47 is operated in accordance with a flow chart shown in FIG. 6. In step 1, the key switch 14 is turned on. If the start switch 19 is turned on in step 2, or if the main stand 15 is retracted in step 3, the next steps 4, 5 and 6 are executed at the same time. In other words, the speaker 55 is operated, the motor 22 is stated, and the indicator window 56 is illuminated at the same time. More specifically, in step 4, the speaker 55 sounds a message such as "This vehicle is an electric vehicle. If the grip is turned gradually, the vehicle will proceed to operate." In step 5, the motor 22 is driven at a speed so as to not operate the centrifugal clutch 36. In step 6, the indicator window 56 is illuminated to visually indicate that the vehicle is an electric vehicle. Then, in step 7, the FET chopper is permitted to be controlled by the grip 18. In other words, the speed control of the motor 22 by the grip 18 is permitted. The above steps 2 and 3 may be executed in series, and the steps 4, 5 and 6 may be executed in parallel.

As described above, when a start preparing operation such as a start switch operation is carried out by an operator at the starting of the vehicle, a signal indicating that the vehicle is an electric vehicle is generated. Therefore, it is possible to prevent the vehicle from being erroneously operated as an engine vehicle by the operator and also to prevent the operator from feeling discomfort at the starting of the vehicle.

Figure 7:
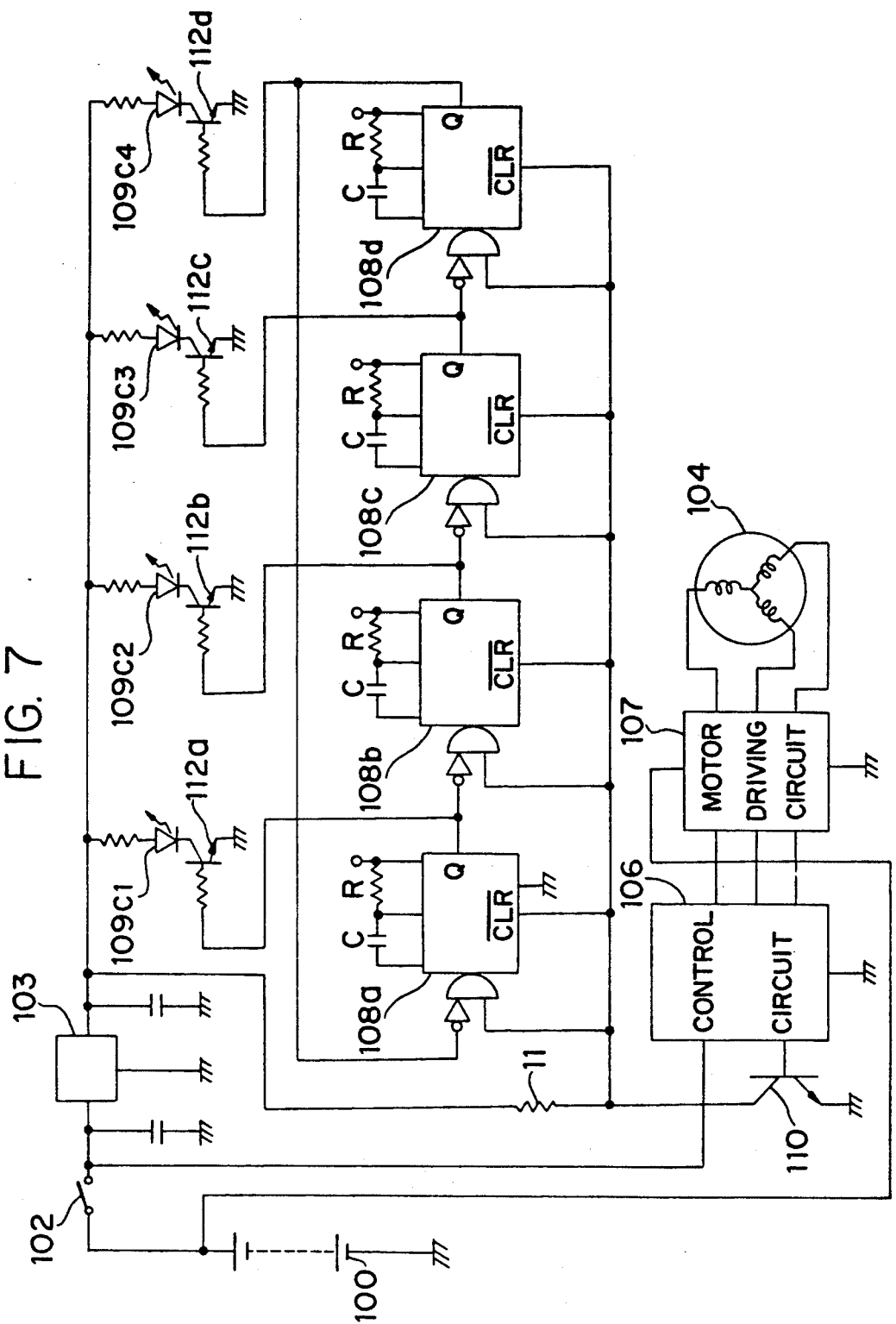
FIG. 7 is a circuit diagram illustrating an electrical construction of an essential part of an electric vehicle to which the information device according to the first preferred embodiment of the present invention is applied.
Figure 8:
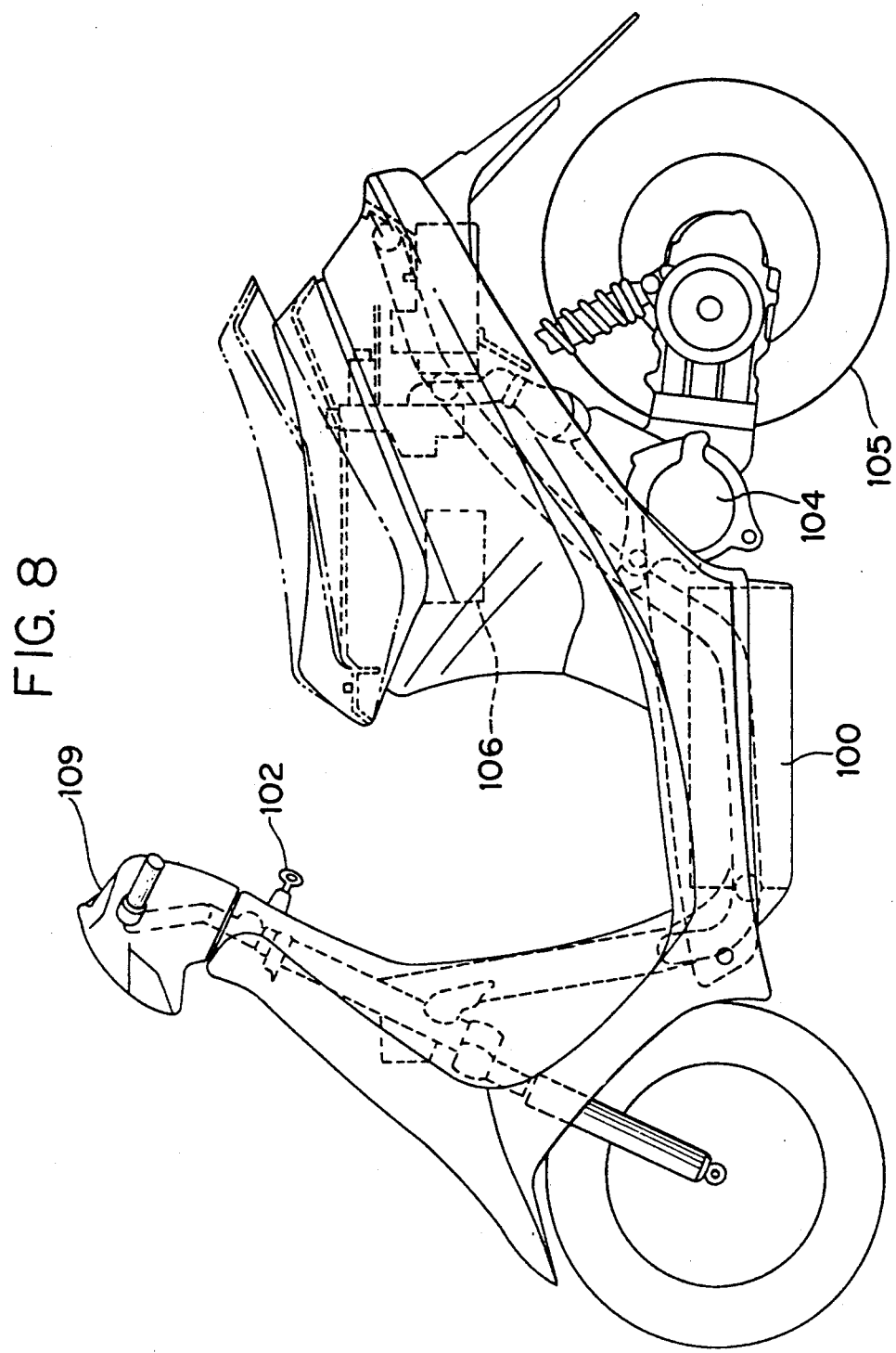
FIG. 8 is a side view illustrating an appearance construction of the electric vehicle to which the information device according to a preferred embodiment of the present invention is applied.
Figure 9A:
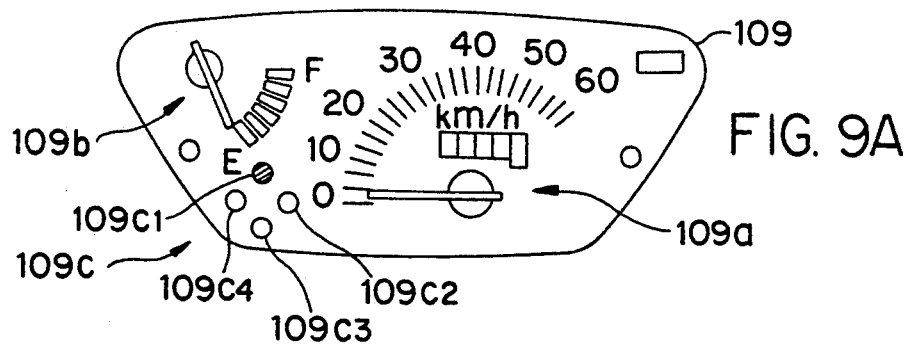
FIGS. 9A-9D is a plan view of the indicating section 9 of the electric vehicle to which the information device according to a preferred embodiment of the present invention is applied, illustrating a flashing condition of the LEDs $109c_1$-$109c_4$.
Figure 9B:
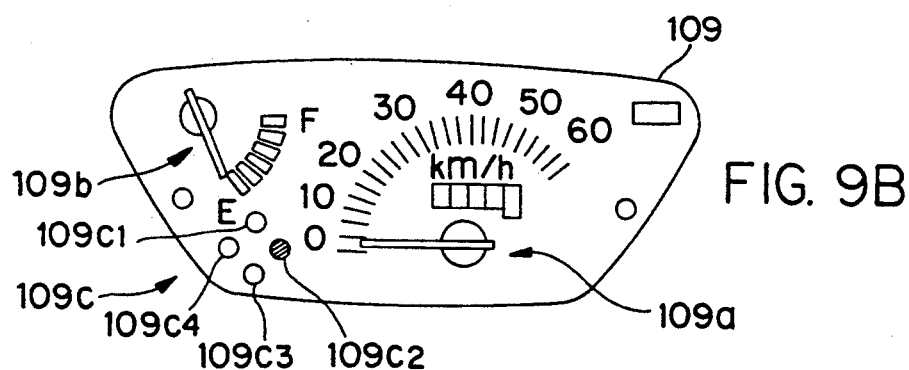
Figure 9C:
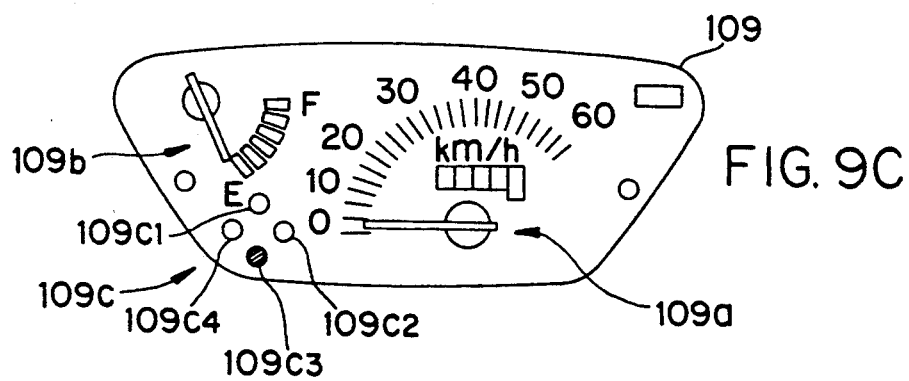
Figure 9D:
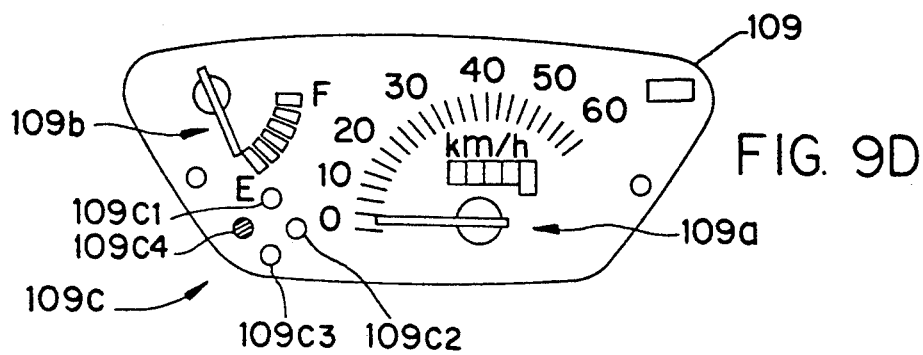

Another embodiment of the present invention is illustrated in FIGS. 7-10. FIG. 7 is a circuit diagram illustrating an electric circuit showing essential parts of an electric vehicle to which the information device according to the present invention is applied. FIG. 8 is a side view illustrating an appearance of the construction of the electric vehicle to which the information device according to the present invention is applied. As shown in FIGS. 7 and 8, the electric vehicle includes a battery 101, a main switch 102, and a voltage regulator circuit 103. A motor 104 is provided for rotationally driving a rear wheel 105. A control circuit 106 controls the information device. A motor driving circuit 107 is adapted to be controlled by the control circuit 106 and drive the motor 104. One-shot multivibrators 108a–108d are each adapted to be triggered by a trigger pulse and output a pulse of a level "H" for a given period of time to be determined by a resistor R and a capacitor C.

Referring to FIG. 8, an indicating housing 109 is provided. As shown in FIG. 9A-9D, the indicating housing 109 includes, for example, a speedometer 109a, a battery meter 109b, and an indicator 109c consisting of four LEDs (light emitting diodes) $109c_1$–$109c_4$.

Referring to FIG. 7, the circuit shown includes a transistor 110 adapted to be turned on and off by the control circuit 106, a resistor 111, and transistors 112a–112d adapted to be turned on and off by Q output pulses from the one-shot multivibrators 108a–108d to supply current to the LEDs $109c_1$–$109c_4$, respectively, thereby sequentially energizing the LEDs $109c_1$–$109c_4$ for a given period of time.

The operation of the control circuit 106 wherein the main switch 102 of the electric vehicle is turned on will now be described with reference to the flow chart shown in FIG. 10.

When the main switch 102 of the electric vehicle is turned on, power is supplied from the battery 101 through the main switch 102 to the control circuit 106. Then, the control circuit 106 controls the motor driving circuit 107 to rotationally drive the motor 104, and also turns on the transistor 110. As a result, the motor 104 starts rotating, and the collector voltage of the transistor 110 reaches an "L" level. Therefore, an output of the voltage regulating circuit 103 is grounded through the resistor 111, and all the one-shot multivibrators 108a–108d are cleared. Accordingly, all the Q output pulses from the one-shot multivibrators 108a–108d are at the "L" level, so that all the transistors 112a–112d are off to maintain all the LEDs $109c_1$–$109c_4$ in a de-energized condition.

When the control circuit 106 proceeds to carry out the processing of step S1, in which the control circuit 106 determines whether or not a rotating speed Nm of the motor 104 detected by a sensor, not shown, is equal to or greater than a preset value Nset which is less than a rotating speed of the motor 104 under a clutch engaged condition. If the answer in step S1 is NO, that is, if the rotating speed Nm is less than the preset value Nset, the control circuit 106 proceeds to carry out the processing of step S2.

In step S2, the control circuit 106 controls the flashing of the LEDs $109c_1$–$109c_4$. More specifically, the control circuit 106 operates to cut off the transistor 110. As a result, the collector voltage of the transistor 110 reaches an "H" level. Therefore, the output of the voltage regulator circuit 103 rises to a predetermined potential, and the cleared condition of the one-shot multivibrators 108a–108d is cancelled. Accordingly, the Q output pulse from the one-shot multivibrator 108a first reaches an "H" level for a given period of time to be determined by the resistor R and the capacitor C, and the transistor 112a is accordingly turned on to allow a supply of current to the LED $109c_1$ and energize the same for a given period of time, see FIG. 9A.

When the given period of time has elapsed, the Q output pulse from the one-shot multivibrator 108a reaches the "L" level to cut off the transistor 112a. Accordingly, the supply of current to the LED $109c_1$ is cut to de-energize the LED $109c_1$. At this time, the one-shot multivibrator 108b is triggered by the Q output pulse from the one-shot multivibrator 108a, and the Q output pulse from the one-shot multivibrator 108b accordingly reaches the "H" level for a given period of time to turn on the transistor 112b and therefore allow supply of current to the LED $109c_2$, thus energizing the LED $109c_2$ for the given period of time, see FIG. 9B.

Such an operation as mentioned above is sequentially repeated to thereby repeat the sequential flashing of the LEDs $109c_1$–$109c_4$ for every given period of time. Thus, an operator is informed that the electric vehicle is in a start preparing condition. The control circuit 106 then returns to carry out the processing of step S1.

If the answer in step S1 is YES, that is, if the rotating speed Nm of the motor 104 rises to become equal to or greater than the preset value Nset, the control circuit 106 proceeds to carry out the processing of step S3.

In step S3, the control circuit 6 terminates the flashing control of the LEDs $109c_1$–$109c_4$. More specifically, the control circuit 106 operates to turn on the transistor 110. As a result, the collector voltage of the transistor 110 reaches the "L" level. Therefore, the output of the voltage regulator circuit 103 is grounded through the resistor 111, and all the one-shot multivibrators 108a–108d are cleared. Accordingly, all the Q output pulses from the one-shot multivibrators 108a–108d reach the "L" level, and all the transistors 112a–112d are therefore cut off to de-energize all the LEDs $109c_1$–$109c_4$. Thus, the operator is informed that the electric vehicle has completed the start preparation condition. The control circuit 106 then returns to carry out the processing of step S1.

As mentioned above, after the operator turns on the main switch 102 of the electric vehicle, and the LEDs $109c_1$–$109c_4$ are sequentially and circularly flashed to indicate that the electric vehicle is in the start preparing condition, the flashing is terminated. Accordingly, the operator can sufficiently recognize that the electric vehicle has completed the start preparation condition. Further, the operator is relieved from the annoyance due to the illumination of the LEDs $109c_1$–$109c_4$. during operation of the vehicle in daylight or nighttime conditions. Further, as the LEDs $109c_1$–$109c_4$ are not illuminated during operation, the electricity is prevented from be wasted. Further, even in the case where the operator is familiar with driving a vehicle powered by an internal combustion engine and changes to an electric vehicle, there is no possibility of the operator feeling discomfort.

Figure 12:
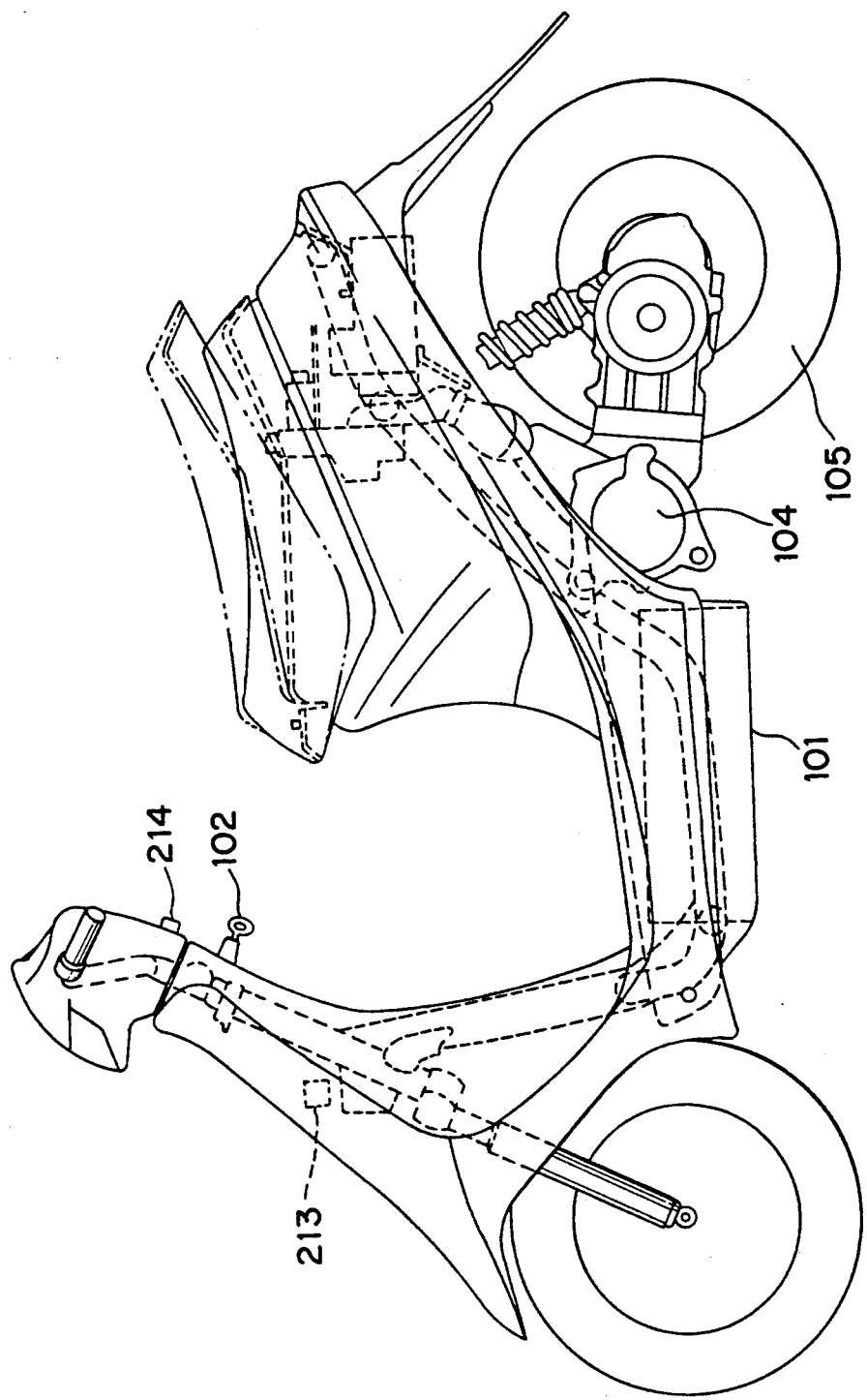
FIG. 12 is a side view illustrating an appearance construction of the electric vehicle to which the information device according to another preferred embodiment of the present invention is applied.

FIG. 11 is a circuit diagram illustrating an electrical circuit for an information device for an electric vehicle according to another preferred embodiment of the present invention. FIG. 12 is a side view illustrating the appearance of the electric vehicle which includes an information device according to another preferred embodiment. In FIGS. 11 and 12, the parts corresponding to those shown in FIGS. 7 and 8 are designated by the same reference numerals, and the explanation thereof will be omitted. The information device includes a communication horn 213, a communication switch 214, and a one-shot multivibrator 215 adapted to be triggered by a trigger pulse and output a pulse having an "H" level for a given period of time.

In operation, when the main switch 102 of the electric vehicle is turned on, a bias is applied to the base of transistor $Tr_1$ of the one-shot multivibrator 215 by resistors $Rc_2$, $Rb_2$ and $Rb_3$. Therefore, a base voltage $V_{B1}$ of the transistor $Tr_1$ reaches predetermined potential to turn on the transistor $Tr_1$ and ground a connection point between the collector of the transistor $Tr_1$ and a capacitor Cb. In other words, the voltage $V_{C1}$ of the transistor $Tr_1$ becomes zero. Accordingly, a base voltage $V_{B2}$ of transistor $Tr_2$ becomes equal to or less than a predetermined potential to cut off the transistor $Tr_2$ and apply power from the battery 101 across the communication horn 213. As a result, a completion of start preparation sound is generated from the communication horn 213. The capacitor Cb is charged for a given period of time to be determined by values of the capacitor Cb and a resistor $Rb_1$.

After the capacitor Cb has been charged, and a potential at a connection point between the capacitor Cb and the resistor $Rb_1$, that is, the base voltage $V_{B2}$ of the transistor $Tr_2$ reaches a predetermined value, the resistor $Tr_2$ is turned on. Accordingly, a connection point among the collector of the transistor $Tr_2$, a capacitor Cs, the resistor $Rb_2$, and the resistor $Rc_2$ is grounded, that is a collector voltage $V_{C2}$ of the transistor $Tr_2$ becomes zero. Accordingly, the base voltage $V_{B1}$ of the transistor $Tr_1$ becomes equal to or less than a predetermined potential to cut off the transistor $Tr_1$. Accordingly, the potential at the connection point between the collector of the transistor $Tr_1$ and the capacitor Cb, that is, the collector voltage $V_{C1}$ of the transistor $Tr_1$ reaches a predetermined value to cut off the current through the communication horn 13 and stop the generation of the completion of start preparation sound.

Next, the operation will be described in the case where the operator turns on the communication switch 214 under the condition where the main switch 102 is on. When the operator turns on the communication switch 214 at an arbitrary time $t_1$, a trigger pulse Pt shown in FIG. 13A is generated at a terminal "a" shown in FIG. 11, thereby grounding the connection point between the collector of the transistor $Tr_1$ and the capacitor Cb through a diode D, a capacitor Cc and the communication switch 214. Therefore, the collector voltage $V_{C1}$ of the transistor $Tr_1$ is lowered as shown in FIG. 13C, and accordingly the base voltage $V_{B2}$ of the transistor $Tr_2$ becomes less than a predetermined potential as shown in FIG. 13D to cut off the transistor $Tr_2$ and increase the collector voltage $V_{C2}$ of the transistor $Tr_2$ as shown in FIG. 13E. Accordingly, a bias is applied to the base of the transistor $Tr_1$ by the resistors $Rc_2$, $Rb_2$ and $Rb_3$, and the base voltage $V_{B1}$ of the transistor $Tr_1$ becomes a predetermined potential as shown in FIG. 13B. As a result, the transistor $Tr_1$ is energized to ground the connection point between the collector of the transistor $Tr_1$ and the capacitor Cb, that is, to make the collector voltage $V_{C1}$ of the transistor $Tr_1$ zero. Thus, the power of the battery 101 is applied across the communication horn 213 to thereby generate a temporary communication sound from the communication horn 213. The capacitor Cb is charged for a given period of time to be determined by the values of the capacitor Cb and the resistor $Rb_1$.

After the capacitor Cb has been charged, and a time $t_2$ has elapsed, at which time the potential at the connection point between the capacitor Cb and the resistor $Rb_1$, that is, the base voltage $V_{B2}$ of the transistor $Tr_2$ reaches a predetermined value as shown in FIG. 13D, the transistor $Tr_2$ reaches a predetermined value as shown in FIG. 13D, the transistor $Tr_2$ is energized. Accordingly, the connection point among the collector of the transistor $Tr_2$, the capacitor Cs, the resistor $Rb_2$ and the resistor $Rc_2$ is grounded, that is, the collector voltage $V_{C2}$ of the transistor $Tr_2$ becomes zero as shown in FIG. 13E, and the base voltage $V_{B1}$ of the transistor $Tr_1$ becomes less than the predetermined potential. Therefore, the transistor $Tr_1$ is de-energized, and the potential at the connection point between the collector of the transistor $Tr_1$ and the capacitor Cb, that is, the collector voltage $V_{C1}$ of the transistor $Tr_1$ becomes the predetermined value as shown in FIG. 13C to cut off the current through the communication horn 21 and stop the generation of the temporary communication sound.

As mentioned above, when the operator turns on the main switch 102 of the electric vehicle, the start completion preparation sound is generated for a given period of time. Therefore, the operator can sufficiently recognize that the electric vehicle has reached the start completion preparation condition. Further, the operator is relieved from the annoyance due to the illumination of LEDs or the like during operation at night and during the day. Further, even in the case where the operator is familiar with driving a vehicle powered by an internal combustion engine and changes to an electric vehicle, there is no possibility of the operator feeling a discomfort.

Further, when the communication switch 214 is turned on under the condition where the main switch 102 is on, the temporary communication sound is generated for a given period of time. Therefore, in the case where the electric vehicle generates a small noise during operation and gives a warning to a passer-by or the like, there is no possibility of the passer-by or the like being disturbed by a large sound suddenly generated by the electric vehicle.

Further, as a sound source for generating the completion of the start preparation sound and a sound source for generating the temporary communication sound may be commonly employed. Thus, the information device can be constructed at a low cost.

In addition, by independently providing a normal horn switch 216 as shown by a dashed line in FIG. 11, the communication horn 213 can be utilized as a normal horn, thereby simplifying the warning device for giving a warning to the operator and the passer-by or the like. Further, the normal horn for generating a normal warning sound may have a tone different from that of the communication horn 213 for generating the start completion preparation sound and the temporary communication sound.

Figures 15, 16:
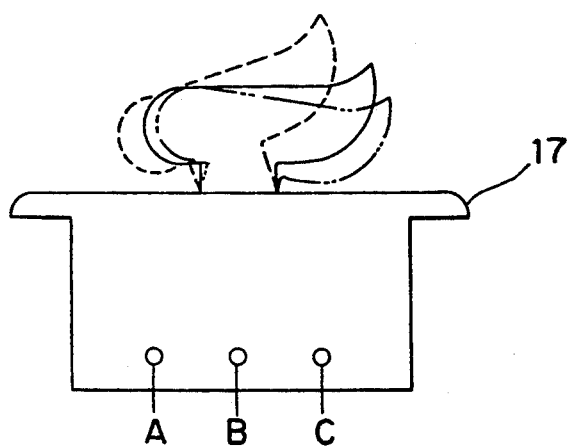
FIG. 15 is a schematic illustration of an appearance construction of the two-stage horn switch 317 shown in FIG. 14.
FIG. 16 is a schematic illustration of a connection state of the two-stage horn switch 317 shown in FIG. 15.

FIG. 14 is a circuit diagram illustrating an electrical construction of the information device for the electric vehicle according to a further preferred embodiment of the present invention. In FIG. 14, the parts corresponding to those shown in FIG. 11 are designated by the same reference numerals, and the explanation thereof will be omitted. Referring to FIG. 14, a two-stage horn switch 317 is provided in substitution for the communication switch 214 shown in FIGS. 11 and 12. In addition, a normal horn 318 is provided. The two-stage horn switch 317 is located at substantially the same position as the communication switch 214 is located as shown in FIG. 12. The appearance of the two-stage horn switch 317 is shown in FIG. 15 by way of example. A connection state of the two-stage horn switch 317 is shown in FIG. 16 by way of example. As is apparent from FIG. 16, in the case that a contact A is connected to a contact B, the two-stage horn switch 317 functions like the communication switch 214. However, in the case where a contact C is connected to the contact B, the two-stage horn switch 317 functions like the normal horn switch 216 shown in FIG. 11.

The operation of the further embodiment is substantially the same as the operation of the previous embodiment. Thus, the explanation thereof will be omitted.

As mentioned above, according to the further embodiment, the information device can be constructed as a single device for generating the start completion preparation sound, the temporary communication sound and the normal warning sound, thus simplifying the construction. Further, as a switch for selecting the temporary communication sound or the normal warning sound is constructed as a single switch, it is possible to prevent the operator from erroneously operating the other switch.

In the embodiment illustrated in FIGS. 7-10, an operator is visually informed of the start completion preparation condition. In the embodiments illustrated in FIGS. 11-13 and 14-16, an operator is audibly informed of the start completion preparation condition. However, as a modification, an operation may be visually and audibly informed of the start completion preparation. In this way, the operator can more sufficiently recognize the start completion preparation condition.

Further, in the embodiments illustrated in FIGS. 11-13 and 14-16, the start completion preparation sound is generated for a given period of time after the main switch 102 is turned on. However, similarly to the embodiment illustrated in FIGS. 7-10, when the rotating speed Nm of the motor reaches the preset value Nset which is less than a rotating speed under the clutch engaged condition, the start preparation completing sound may be generated for a given period of time.

As described above, according to the present invention, the operator can sufficiently recognize the start completion preparation condition without feeling an annoyance. Further, electricity is not wastefully consumed. In addition, even in the case where the operator is familiar with driving a vehicle powered by an internal combustion engine and changes to an electric vehicle, there is no possibility of the operator feeling discomfort.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A warning device for use in an electric vehicle comprising:
   a frame member;
   ground engaging wheels operatively mounted relative to said frame member;
   an electric motor operatively connected to said frame member and said ground engaging wheels for supplying rotational motion to said ground engaging wheels;

a first switch means for selectively energizing the electric motor; and an indicator means for indicating to an operator that the preparation for starting the electric vehicle has been completed for avoiding a discomfort to the operator during initial movement of the electric vehicle, said indicating means being responsive to a rotational speed of said motor and being deactuated during a running condition.

2. The warning device according to claim 1, wherein said first switch means is a switch for operatively connecting said electric motor to a source of power.

3. The warning device according to claim 1, wherein said indicator means provides an audible sound for warning the operator.

4. The warning device according to claim 1, wherein said indicator means provides a visual display for warning the operator.

5. The warning device according to claim 1, and further including a centrifugal clutch operatively connected relative to said electric motor and said ground engaging wheels for supplying rotational power from said electric motor to said ground engaging wheels.

6. The warning device according to claim 5, and further including a grip means for selectively increasing and decreasing an operational speed of said electric motor, said grip means being operational after said electric motor has reached a predetermined rotational speed for actuating said centrifugal clutch.

7. The warning device according to claim 1, and further including a speedometer housing, said indicator means being mounted adjacent to said speedometer housing for supplying a visual display of the completion of the starting operation.

8. The warning device according to claim 1, and further including a plurality of indicator means being sequentially operated for indicating to the operator that the electric vehicle is in the preparation for starting the electric vehicle and being deactuated after said electric vehicle has completed the preparation for starting operation.

9. The warning device according to claim 8, wherein said plurality of indicator means are visual displays which are sequentially illuminated.

10. The warning device according to claim 1, and further including an audible indicator, a communication switch and a control means operatively connected to said first switch means for actuating said audible indicator for a predetermined period of time after said first switch means and said communication switch are actuated.

11. The warning device according to claim 10, wherein said audible indicator is a horn.

12. A warning device for use in an electric vehicle comprising:

a frame member;

ground engaging wheels operatively mounted relative to said frame member;

an electric motor operatively connected to said frame member and said ground engaging wheels for supplying rotational motion to said ground engaging wheels;

a first switch means for selectively energizing the electric motor;

an indicator means for indicating to an operator that the preparation for starting the electric vehicle has been completed; and a movable stand operatively connected to said frame member for supporting said vehicle during periods of non-use and a second switch means connected to said movable stand to be deactuated during use of the movable stand for supporting the vehicle and being actuated when said movable stand is positioned in a stored position during normal use of the vehicle, said second switch means being operatively connected to said indicator means for actuating said indicator means when both said first switch means and said second switch means are actuated.

13. The warning device according to claim 12, wherein said first switch means is a switch for operatively connecting said electric motor to a source of power.

14. The warning device according to claim 12, wherein said indicator means provides an audible sound for warning the operator.

15. The warning device according to claim 12, wherein said indicator means provides a visual display for warning the operator.

16. The warning device according to claim 12, and further including a centrifugal clutch operatively connected relative to said electric motor and said ground engaging wheels for supplying rotational power from said electric motor to said ground engaging wheels.

17. The warning device according to claim 16, and further including a grip means for selectively increasing and decreasing an operational speed of said electric motor, said grip means being operational after said electric motor has reached a predetermined rotational speed for actuating said centrifugal clutch.

18. The warning device according to claim 12, and further including a speedometer housing, said indicator means being mounted adjacent to said speedometer housing for supplying a visual display of the completion of the starting operation.

19. The warning device according to claim 12, and further including a plurality of indicator means being sequentially operated for indicating to the operator that the electric vehicle is in the preparation for starting the electric vehicle and being deactuated after said electric vehicle has completed the preparation for starting operation.

20. The warning device according to claim 19, wherein said plurality of indicator means are visual displays which are sequentially illuminated.

21. The warning device according to claim 12, and further including an audible indicator, a communication switch and a control means operatively connected to said first switch means for actuating said audible indicator for a predetermined period of time after said first switch means and said communication switch are actuated.

22. The warning device according to claim 21, wherein said audible indicator is a horn.

23. A warning device for use in an electric vehicle comprising:

a frame member;

ground engaging wheels operatively mounted relative to said frame member;

an electric motor operatively connected to said frame member and said ground engaging wheels for supplying rotational motion to said ground engaging wheels;

a first switch means for selectively energizing the electric motor;

an indicator means for indicating to an operator that the preparation for starting the electric vehicle has been completed for avoiding a discomfort to the operator during initial movement of the electric vehicle, said indicating means being deactuated during a running condition;

a movable stand operatively connected to said frame member for supporting said vehicle during periods of non-use; and a second switch means connected to said movable stand to be deactuated during use of the movable stand for supporting the vehicle and being actuated when said movable stand is positioned in a stored position during normal use of the vehicle, said second switch means being operatively connected to said indicator means for actuating said indicator means when both said first switch means and said second switch means are actuated.

* * * * *